United States Patent Office 2,927,632
Patented Mar. 8, 1960

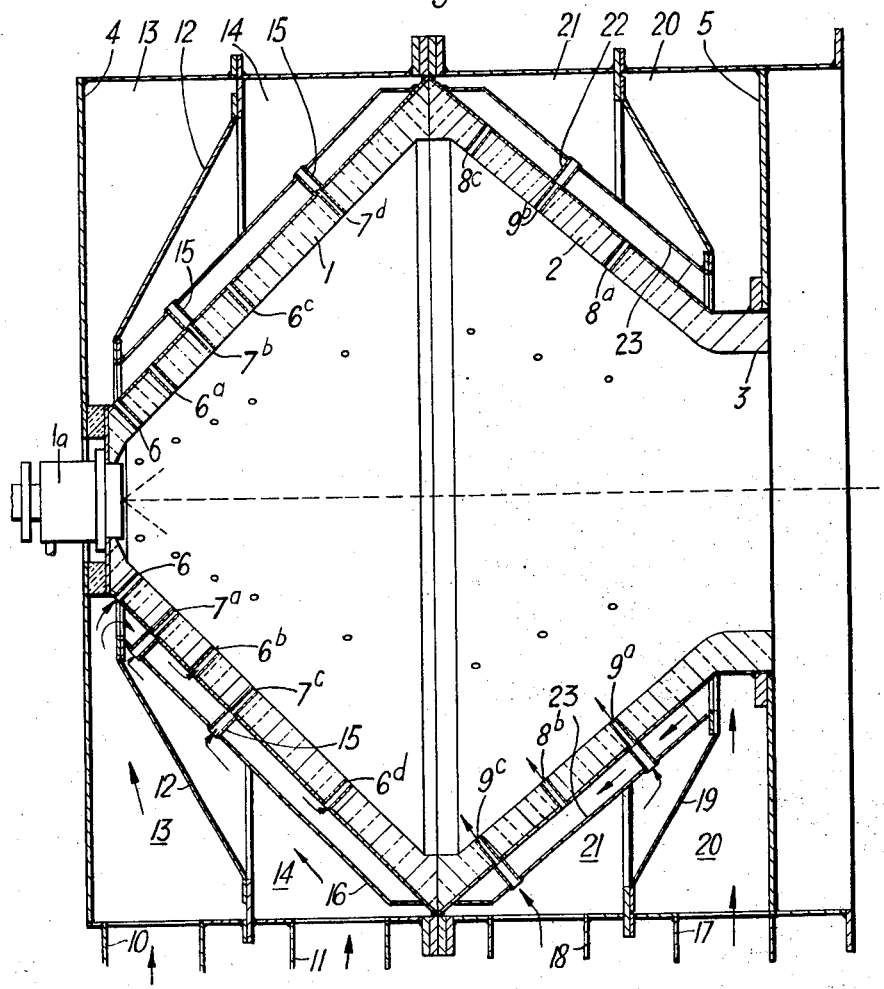

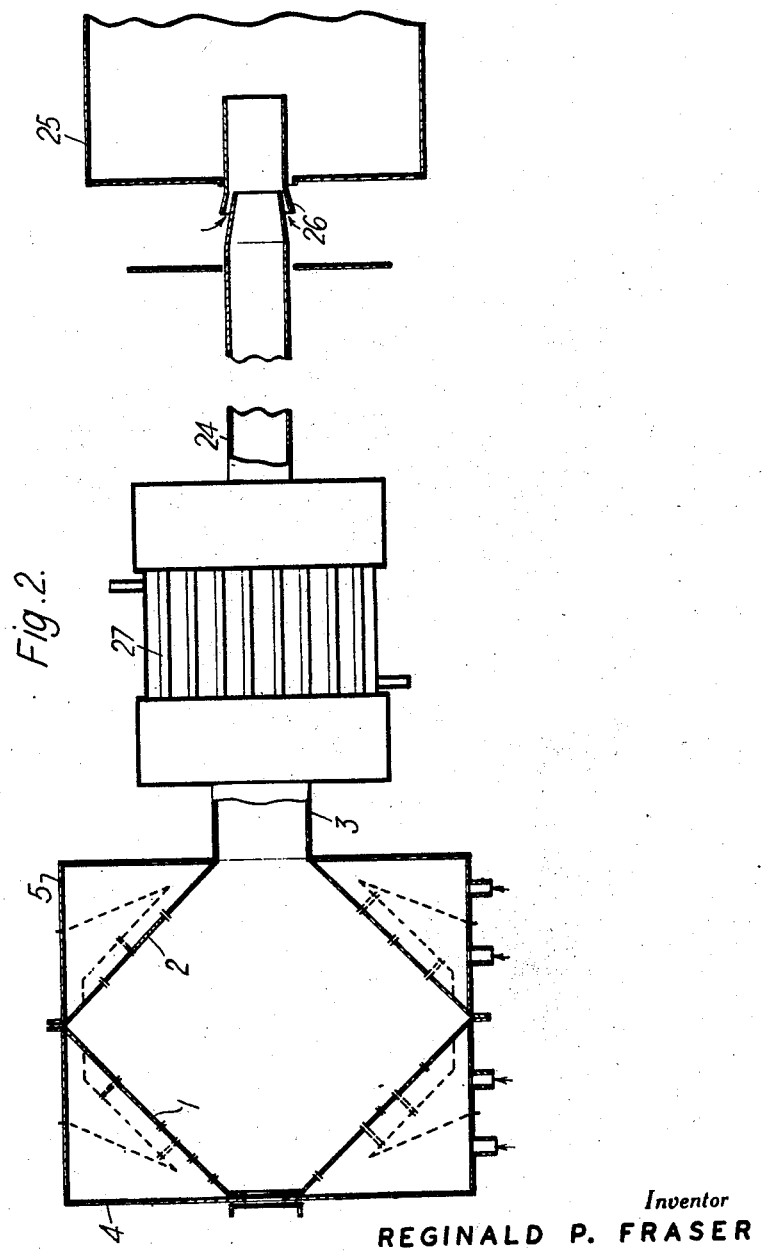

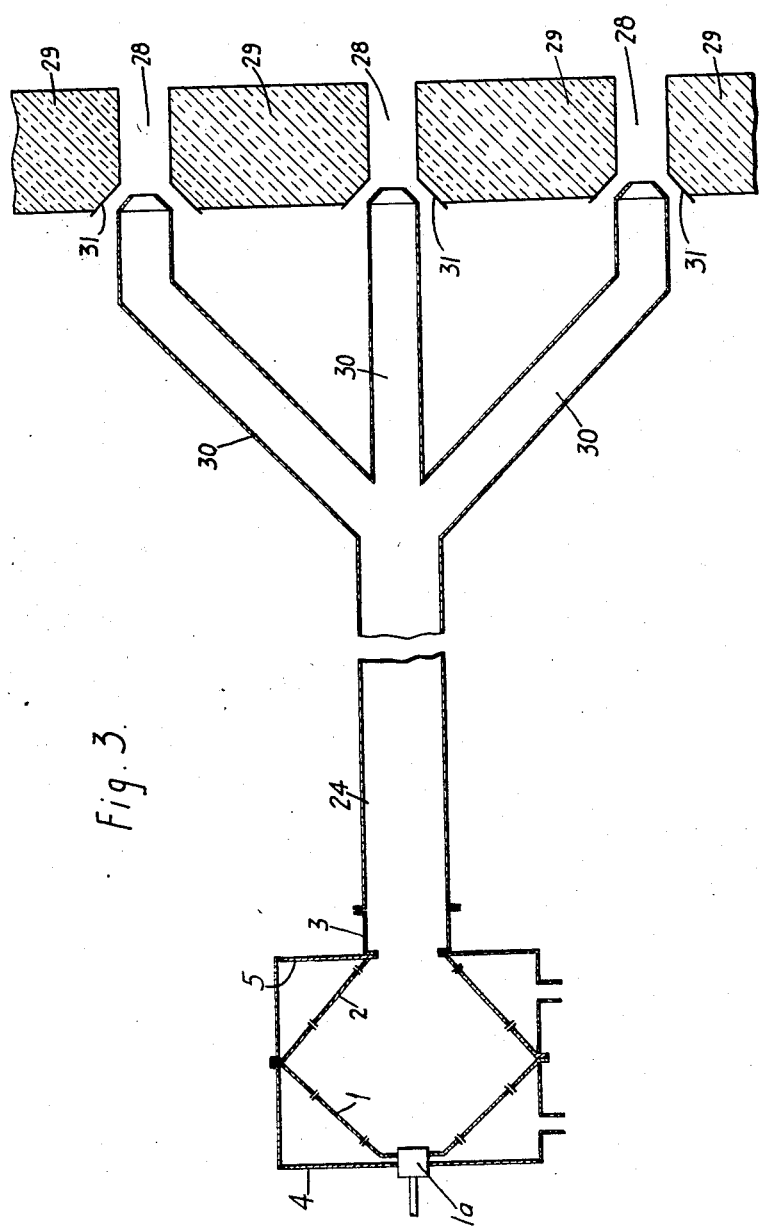

2,927,632

FUEL COMBUSTION APPARATUS AND THE PRODUCTION OF CONTROLLED GASEOUS EFFLUENTS THEREFROM

Reginald Percy Fraser, Kingston Hill, England

Application February 6, 1956, Serial No. 563,772

Claims priority, application Great Britain February 9, 1955

2 Claims. (Cl. 158—4)

This invention relates to fuel combustion apparatus and to the production of controlled gaseous effluents therefrom. A very convenient form of apparatus for the purpose comprises essentially a combustion chamber having a front wall, a rear wall having an efflux duct leading out of said chamber, a liquid fuel atomising device mounted axially in the front wall and adapted to project a wide-angled cone of forwardly divergent fuel spray into said chamber, and means for directing air for combustion through the said rear wall in a direction contra, or having a substantial component contra, to the general direction of flow of the atomised liquid fuel stream such that great turbulence is obtained and effective combustion achieved within the chamber.

In the preferred case in which the fuel atomising device utilises air under pressure to assist in the atomisation, such air is termed primary air, and the additional air directed through the rear wall of the chamber is termed secondary air. Secondary air may also be supplied through the front wall of the chamber to spread over the rear surface of the wide-angled cone of fuel spray.

A preferred constructional form of combustion chamber is one having two opposed conical walls the peripheries of which are connected together either directly or by the intervention of a cylindrical bridge member of a length preferably not exceeding the height or axial dimension of one of the cones, the front wall being provided at its apex region with a liquid fuel spraying device adapted to project a wide-angled cone of atomised fuel, and the rear wall having an axial exit duct or nozzle.

By the term wide-angled cone I mean a cone having a contained angle of 30 degrees upwards, preferably from 60 to 120 degrees. The chamber itself is of considerable diameter in relation to its length the ratio of length to diameter being less than four to one and preferably one to one.

Apparatus of the kind above referred to is very useful for the production from atomised liquid fuel of a stream of hot mixed gases of approximately constant composition substantially free from solid carbon particles or smoky residual products such as could result from the incomplete combustion of a liquid fuel. The great advantage of such an apparatus is that, for any particular setting of the liquid fuel atomiser, the quality and temperature of the gaseous effluent can be fixed precisely, so that a process atmosphere of definite quality can be steadily maintained. Such an effluent or process atmosphere can, for example, be used for the heating or concentrating of liquors by direct submersion therein, or, after dilution with air, for industrial drying operations where a fixed oxygen concentration is required. However, with such an apparatus, if any change is desired in its heating producing capacity by changing the fuel input, such change cannot be accompanied by changing the secondary air input without affecting the degree of turbulence and hence also the combustion efficiency, and if on the other hand the secondary air input is maintained unchanged the quality of the gaseous effluent is affected.

The chief object of the present invention is to provide improved fuel combustion apparatus of the kind above referred to and in particular to provide means for enabling the quality of the effluent to be readily controlled as well as its quantity and temperature with or without changing the fuel input.

With the above object in view the present invention consists in providing at least two controls for determining or regulating the supply to the combustion chamber of secondary air or other gaseous mixtures or of any preselected gas or vapour. In this way the supply of some of the air or gas or vapour to the combustion chamber can be set and maintained in velocity whereas the remainder can be subject to variation of quantity by change of pressure and thus of velocity. For this purpose a casing enclosing the combustion chamber but spaced therefrom may be provided with two or more inlets leading respectively to two or more compartments. For this purpose the space between the combustion chamber walls and the surrounding casing may be suitably partitioned so that the air or gas or vapour supplied to one compartment and thence to one set of jets or inlet passages to the combustion chamber is separate from the air or gas or vapour supplied to the other compartment or compartments and thence to another set or sets of jets or inlet passages.

Reference will now be made to the accompanying drawings in which Figure 1 is a longitudinal sectional elevation of one embodiment of the improved combustion apparatus according to the present invention, and Figures 2 and 3 are somewhat diagrammatic illustrations of uses of the said apparatus and its effluent.

Referring first to Figure 1 the apparatus shown comprises the conical front wall 1, the opposed conical rear or end wall 2 with axial efflux duct 3, and a surrounding casing consisting of the half casing 4 for the front wall 1, and the half-casing 5 for the rear wall 2.

The front wall 1 has sets of inlets 6, 6a, 6b, 6c and 6d, each set being arranged as a circular group disposed symmetrically with respect to the axis of the said wall. The said front wall also has similar sets of inlets 7a, 7b, 7c and 7d disposed similarly to the inlets 6a, 6b, 6c and 6d. The inlets 6a are in the same circular group as the inlets 7a and alternate with them. Similarly with regard to the inlets 6b, 7b, and 6c, 7c, and 6d, 7d.

The rear wall 2 has sets of inlets 8a, 8b and 8c, each set being arranged as a circular group disposed symmetrically with respect to the axis of the said wall. The said rear wall also has similar sets of inlets 9a, 9b and 9c disposed similarly to the inlets 8a, 8b and 8c. The inlets 8a are in the same circular group as the inlets 9a and alternate with them. Similarly with regard to the inlets 8b, 9b and the inlets 8c, 9c.

The half-casing 4 has two supply ports 10 and 11, and the space enclosed between it and the exterior of the front wall 1 is divided by a partition wall 12 into two compartments 13 and 14. The inlets 6, 6a, 6b, 6c and 6d, are in direct communication with the compartment 13, and the inlets 7a, 7b, 7c, and 7d, are in communication with the compartment 14 by way of tubular bridge pieces 15 fitted into a plate 16 which in conjunction with the partition wall 12 serves in the formation of the compartment 14.

The half-casing 5 has two supply ports 17 and 18, and the space enclosed between it and the exterior of the rear wall 2 is divided by the partition 19 into two compartments 20 and 21. The inlets 8a, 8b and 8c are in direct communication with the compartment 20 and the inlets 9, 9a and 9b are in communication with the compartment 21 by way of tubular bridge pieces 22 fitted into a plate 23 which in conjunction with the partition wall 19 serves in the formation of the compartment 21.

A burner or atomiser 1a, shown in outline in Figure 1, is fitted axially into the front wall 1 at its apex and discharges fuel as a wide angled forwardly divergent cone of combustible spray which on ignition maintains a flame within the chamber. A controlled amount of air, so-called primary air, may be supplied to the interior of the atomiser to assist in the atomisation of the liquid fuel also supplied to the atomiser.

The flame producing medium from the atomiser 1a may be supplemented by separate and separately controlled supplies of secondary air or gas or vapour or a mixture thereof delivered by the inlets 6, 6a, 6b, 6c and 6d on the one hand, and by the inlets 7a, 7b, 7c and 7d on the other hand.

Further, and in particular, separate and separately controlled supplies of secondary air or gas or vapour including steam or a mixture thereof are delivered to the combustion chamber through the respective sets of inlets 8a, 8b and 8c and 9a, 9b and 9c, in a direction having a component contra to that of the flame so as to constrain the combustion to occur well within the combustion chamber. The provision of two inlet ports 17 and 18 and the above described partitioning of the chamber within the half casing 5 enables considerable variations to be imposed upon the separate supplies of secondary air or gas or vapour or a mixture thereof to the respective sets of inlets. For example, for any particular setting of the fuel atomiser delivering atomised liquid fuel throught the apex of the front wall 1, a constant supply of secondary air or gas or vapor may be maintained to the inlets 8a, 8b, 8c thereby determining a definite quality and temperature in the efflux gases, and, without changing the setting of the atomiser or the supply to the said inlets 8a, 8b, 8c, the efflux gases may be changed in quality, quantity and temperature by supplying supplementary air or gas or vapour to the inlets 9a, 9b, 9c. Alternatively, the fuel supply to the atomiser may be made to vary between two limits. At the lower limit of fuel supply the quality of the efflux gases will be determined by the amount and quality of the air or gas or vapour entering through the ports 10 and 17 to the inlets 6, 6a, 6b, 6c, 6d and the inlets 8a, 8b, 8c, and at the upper limit, by the quantity and type of gases entering through all of the inlets, i.e. including the additional media entering via the ports 11 and 18 and the inlets 7a, 7b, 7c, 7d and the inlets 9a, 9b, 9c. Thus the quality of the efflux gases and the heat may be modulated between two limits by variation of the flow of fuel to the atomiser in conjunction with the flow through ports 11 and 18 to the inlets.

Combustion apparatus of the kind above described enables the combustion of liquid fuel to take place under such good control that a clean mixture of hot gases substantially free from carbon particles or smoky products and consisting mainly of carbon dioxide and nitrogen, but substantially no oxygen or only a limited and known quantity, can be produced. Combustion can therefore be achieved approximating to theoretical perfection. One of the advantages of the additional control over combustion rendered available by the present invention is that combustion can be made to proceed at considerably below stoichiometric proportions without the production of carbon or smoke such that the said mixture will be of a reducing character, and as such may be of industrial value as for example in providing a reducing atmosphere for electrical furnaces. Alternatively, this additional control may be combined with the step of adding steam to the combustion gases to generate the "water gas" reaction, and of subsequently adding a controlled supply of air to the stream of efflux gases, this additional air under control serving to be burnt with the carbon monoxide and hydrogen of the water gas and thereby producing a controlled amount of heat at a point remote from the combustion chamber, as illustrated for example in Figures 2 and 3 of the drawings. In Figure 2 the efflux gases from the combustion chamber are shown as being conveyed from the efflux duct 3 along a conduit 24 to a near or distant chamber or furnace 25 to which air may be admitted as at 26 for admixture with the efflux gases from the primary chamber to form a combustible gas mixture. The heat in the gases leaving the primary chamber is intense and some of it may, if desired, be withdrawn from the gases while on their way to the furnace 25 by passing through a waste heat boiler or heat exchanger illustrated diagrammatically in Figure 2 at 27. In an alternative arrangement shown in Figure 3 the heat exchanger is omitted and the effluent gases from the combustion chamber pass along the conduit 24 to three inlets 28 in a furnace wall 29, the conduit 24 being branched accordingly, and the exit ends of the three branch pipes 30 being surrounded by air into collars 31.

The assembly of apparatus according to Figures 2 and 3 may be used effectively with or without the multiple control means for the secondary air supply to the combustion chamber.

Notwithstanding the advantage to be derived from adding air or oxygen to the efflux gases from the combustion chamber according to Figures 2 and 3, it is to be understood that the additional air or oxygen supplied to the efflux gases need not necessarily be for the purpose of forming a combustible mixture to be burnt at some remote point; on the contrary the additional air or oxygen may be added merely to form some predesired mixture of gases for some particular purpose.

What I claim is:

1. Liquid fuel combustion apparatus comprising essentially a stationary combustion chamber having a forwardly divergent conical entry wall, a co-axial rearwardly divergent conical rear wall, each of said walls having a peripheral edge, the rear wall being connected at its peripheral edge to the peripheral edge of the entry wall, said rear wall further having an efflux duct formed at its apex region, a liquid fuel atomising device mounted axially at the apex of the said entry wall and adapted to project into said chamber an atomised liquid fuel spray forwardly divergent with a conicity corresponding substantially with that of said entry wall, a circular group of inlet passages through said rear wall disposed symmetrically with respect to the chamber axis and directed inwardly towards a point within and adjacent the apex of the fuel spray, a second similar group of inlet passages through said rear wall alternating with and in the same circle as the passages of the first mentioned group, a casing surrounding the said rear wall in spaced relation thereto, a partition dividing the interior of the casing into two compartments, said partition including a plate-like member extending over both groups of inlet passages in spaced relation thereto, a separate gaseous medium supply inlet through the said casing into each compartment, and a circular group of tubular bridge pieces extending from said plate-like member to the passages of one of the said circular groups of inlet passages.

2. Apparatus according to claim 1 including a circular group of inlet passages through the said entry wall disposed symmetrically with respect to the chamber axis and directed onto the rear surface of the conically dispersed fuel spray, a similar second group of inlet passages through said entry wall alternating with and in the same circle as the passages of the first mentioned group, a further casing surrounding the said entry wall in spaced relation thereto, a further partition dividing the interior of the said further casing into two compartments, said further partition including a plate-like member extending over both groups of inlet passages in spaced relation thereto, a separate gaseous medium supply inlet through said further casing into each compartment, and a circular group of tubular bridge pieces extending from said further plate-like member to the passages of one of the said circular groups of inlet passages.

References Cited in the file of this patent

UNITED STATES PATENTS

| | | |
|---|---|---|
| 615,445 | Gearing | Dec. 6, 1898 |
| 1,618,808 | Burg | Feb. 22, 1927 |
| 1,711,273 | Manker | Apr. 30, 1929 |
| 2,029,580 | Merkt | Feb. 4, 1936 |
| 2,122,683 | Faverty | July 5, 1938 |
| 2,206,552 | Nagel | July 2, 1940 |
| 2,206,553 | Nagel | July 2, 1940 |
| 2,311,350 | Richardson | Feb. 16, 1943 |
| 2,536,599 | Goddard | Jan. 2, 1951 |
| 2,602,290 | Goddard | July 8, 1952 |
| 2,638,895 | Swindin | May 19, 1953 |
| 2,725,929 | Massier | Dec. 6, 1955 |

FOREIGN PATENTS

| | | |
|---|---|---|
| 436,633 | Germany | May 29, 1924 |
| 620,813 | France | Apr. 29, 1927 |
| 462,195 | Canada | Jan. 3, 1950 |
| 703,914 | Great Britain | Feb. 10, 1954 |
| 1,062,061 | France | Apr. 20, 1954 |